United States Patent [19]
Paatelma et al.

[11] Patent Number: 6,029,057
[45] Date of Patent: *Feb. 22, 2000

[54] DIVERSITY METHOD, A RADIO RECEIVER AND A RADIO SYSTEM

[75] Inventors: Risto Paatelma; Markku Tarkiainen; Tapani Westman, all of Oulu, Finland

[73] Assignee: Nokia Mobile Phones Ltd., Salo, Finland

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,717

[22] Filed: Apr. 16, 1997

[30] Foreign Application Priority Data

Apr. 17, 1996 [FI] Finland ..................... 961673

[51] Int. Cl.[7] ........................................ H04B 7/02
[52] U.S. Cl. ................... 455/277.2; 455/134; 455/277.1
[58] Field of Search ..................... 455/132, 135, 455/134, 272, 137, 273, 276.1, 277.1, 277.2, 278.1, 296, 101, 133; 375/347

[56] References Cited

U.S. PATENT DOCUMENTS

| | | | |
|---|---|---|---|
| 4,856,080 | 8/1989 | Hulkko | 455/139 |
| 5,119,501 | 6/1992 | Perry et al. | 455/134 |
| 5,276,920 | 1/1994 | Kuisma | 455/101 |
| 5,548,837 | 8/1996 | Hess et al. | 455/276.1 |
| 5,561,673 | 10/1996 | Takai et al. | 455/277.2 |
| 5,684,793 | 11/1997 | Kiema et al. | 455/135 |
| 5,740,526 | 4/1998 | Bonta et al. | 455/135 |

*Primary Examiner*—Doris H. To
*Attorney, Agent, or Firm*—Perman & Green, LLP

[57] ABSTRACT

The present invention relates to a diversity method in a radio system in which fadeouts are slow, such as a WLL system. The duration of fadeouts is typically in the magnitude of seconds. A radio receiver (4) according to the present invention is characterized in that the expected quality of a signal is predicted (9) for a specific interval to come based on the measured quality of the signal, and a signal is selected (3) based on the predicted quality of the signal. In a time-divided digital system, the quality of a signal is measured from a burst and the quality of the signal is predicted for several frames ahead, for example for 10 frames, based on the measured quality of said burst and one or more bursts preceeding said burst. The predicted quality is compared with a long-term weighted average, which may be the average over 50 frames, for example. If the predicted quality is below the weighted average, the signal is changed.

10 Claims, 3 Drawing Sheets

$$r_n = \sum_{i=0}^{N} C_i I_{n-1}$$

DIVERSITY METHOD, A RADIO RECEIVER AND A RADIO SYSTEM

BACKGROUND OF THE INVENTION

The present invention relates to a diversity method in a radio system in which the duration of fadeouts is typically in the magnitude of seconds, a radio receiver intended for use in such a radio system, and a radio system.

Fadeouts are a common problem in radio transducer systems. Many different methods have been developed to alleviate this problem, with various diversity methods being the most important. In digital radio systems, channel coding, interleaving and frequency hopping are also often used to lessen the effects of fadeouts. The last-mentioned methods are commonly used in digital mobile communication systems, such as the European GSM system.

The present invention also relates to switching position diversity reception in which several different antennas, usually two antennas, are located in different places sufficiently and suitably distant from each other with regard to transmission wave length, and one of the optionally selectable antennas is connected to a receiver. Several different strategies are available for selecting one of the antennas. The simplest and commonly used method is to switch to a second antenna and begin receiving its signal whenever a signal received from a first antenna becomes weak. The antennas are located so that the signal quality of the second antenna predictably will be better. In a searching switching method, connections are rapidly made between several antennas until the signal quality of one of the antennas exceeds a specified quality limit, whereupon reception of said signal begins. In a selective diversity method, which is an alternative to the switching diversity method, the best signal is always selected. A disadvantage of this method is that several receiver circuits are required to simultaneously examine the quality of received signals. Therefore, this method easily becomes expensive.

FIG. 1 presents a solution based on the switching diversity method. This method is suitable for use in a radio receiver in which fadeouts occur in rapid succession. Such a situation often exists, for example, in a moving mobile communication terminal. In the solution of FIG. 1, a signal is available to a radio receiver 4 from two different antennas 1 and 2. A switch 3, which is used to select a signal from one antenna or the other, is controlled by means of a diversity method. The signal quality is measured in block 18, and the short-term average quality of the signal is calculated in block 5. Additionally, the long-term average quality is calculated in block 6 and multiplied by a selected weighting coefficient in block 7. The short-term average represents the momentary quality of the signal, and the weighted long-term average represents the signal quality limit that the momentary signal quality value is compared to in block 8. If the short-term average is lower than the weighted long-term average, a control generated by the comparison block 8 causes a switch 3 to select another antenna. In time-divided digital systems, in which a signal is received as short bursts at certain intervals, it is advantageous to use the signal quality measured from each burst as the short-term average. The long-term average signal quality is calculated over a long enough period to ensure that it truly represents the average quality of the radio channel. The parameter that depicts signal quality can be, for example, signal strength, signal-to-noise ratio, bit error ratio or mean square error.

In fixed wireless systems, which are often referred to as WLL systems (WLL, Wireless Local Loop) and in which a fixed telephone network is realized by means of radio connections and cellular nets, a terminal is located in a specific place, where it is completely stationary or its movement is very limited, in like manner as a terminal of a normal public telephone network. In such systems, fadeouts seen by a receiver are primarily caused by moving objects that reflect radio waves, and fadeouts develop slowly and last long. The duration of a fadeout may typically be in the magnitude of seconds, and fadeouts may not disappear until the reflecting object has moved sufficiently. In such a case, channel coding may quit functioning in a digital transmission. Interleaving and channel coding are not able to guarantee adequate performance on a channel that is susceptible to this type of fadeout. In this conjunction it must be noted that subscribers equate WLL systems with a fixed wire telephone network, placing the same quality requirements on it, and the fadeout phenomenon is unacceptable to them. Therefore, it is quite probable that diversity reception will be required in the terminals of fixed wireless networks. The simplest and least expensive diversity method is the position diversity method described above with references to FIG. 1, which nevertheless is not the best possible method for WLL systems.

SUMMARY OF THE INVENTION

The purpose of the present invention is to produce an improved simple diversity method suitable for terminals of fixed wireless systems.

A diversity method in a radio system according to the present invention, in which the duration of fadeouts is typically in the magnitude of seconds and a signal is selected for a radio receiver by connecting one of several antennas to the receiver and by making the selection based on the measured quality of the signal, is characterized in that, additionally, based on the measured signal quality, the quality of the signal is predicted for a specific period to come and the selection is made based on the predicted quality of the signal.

In a radio system in which signals are digital time-divided signals and they are made up of bursts within certain intervals of consecutive frames that are divided into intervals, signal quality is advantageously measured from a burst, and the signal quality is predicted for several frames ahead based on the measured signal quality of said burst and one or more bursts prior to said burst.

The signal quality is advantageously predicted from the results of the measurement by means of extrapolation. The signal quality can be measured by measuring or estimating one of the following: signal strength, bit error ratio, signal-to-noise ratio, mean squre error.

In an embodiment of the method according to the present invention, a limit is specified for the quality of the signal by calculating a weighted long-term average and another signal is selected if the predicted quality of the signal goes below the specified limit.

A radio receiver according to the present invention, which is intended to operate in a radio system in which the duration of fadeouts is in the magnitude of seconds, and which utilizes switching position diversity reception, is characterized in that it includes means for predicting signal quality and controlling position diversity reception based on the predicted quality of a signal.

A radio system according to the present invention, in which the duration of fadeouts is in the magnitude of seconds and which includes one or more radio receivers having switching position diversity reception, is characterized in that at least one of said receivers includes means for predicting signal quality and controlling position diversity reception based on the predicted quality of a signal.

DESCRIPTION OF THE DRAWINGS

The present invention is described in more detail below, with references to the enclosed drawings.

Figure 1:
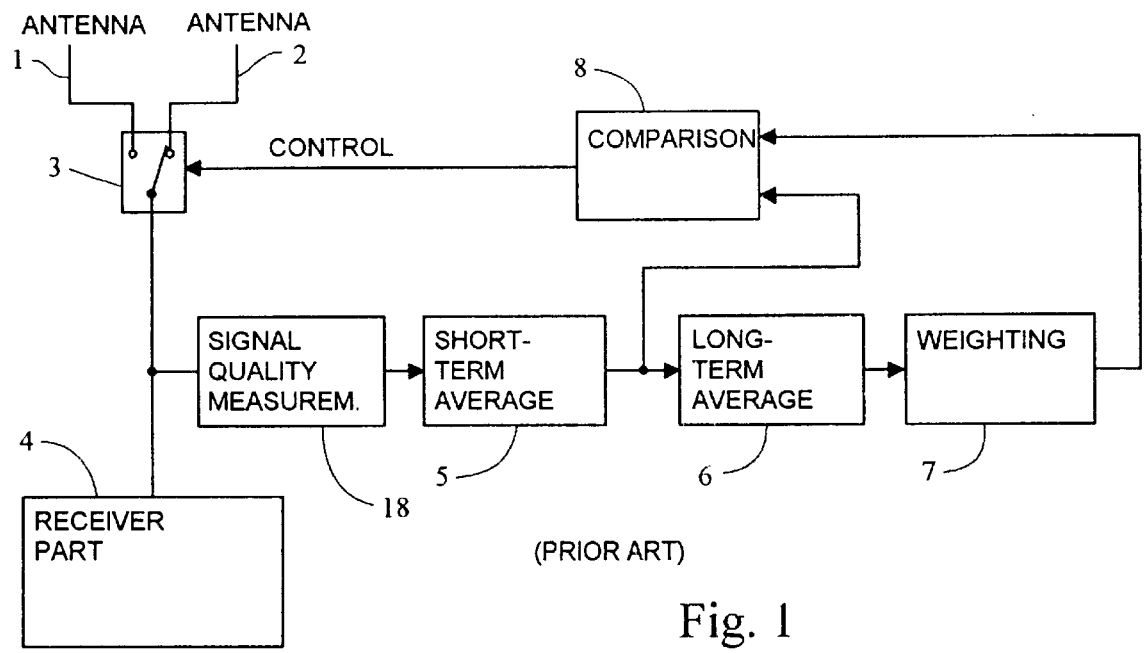
FIG. 1 is a block diagram that illustrates a diversity method according to the prior art.

The diversity method according to the prior art illustrated in FIG. 1 is explained above in the section on the background of the present invention.

DETAILED DESCRIPTION OF THE INVENTION

Figure 2:
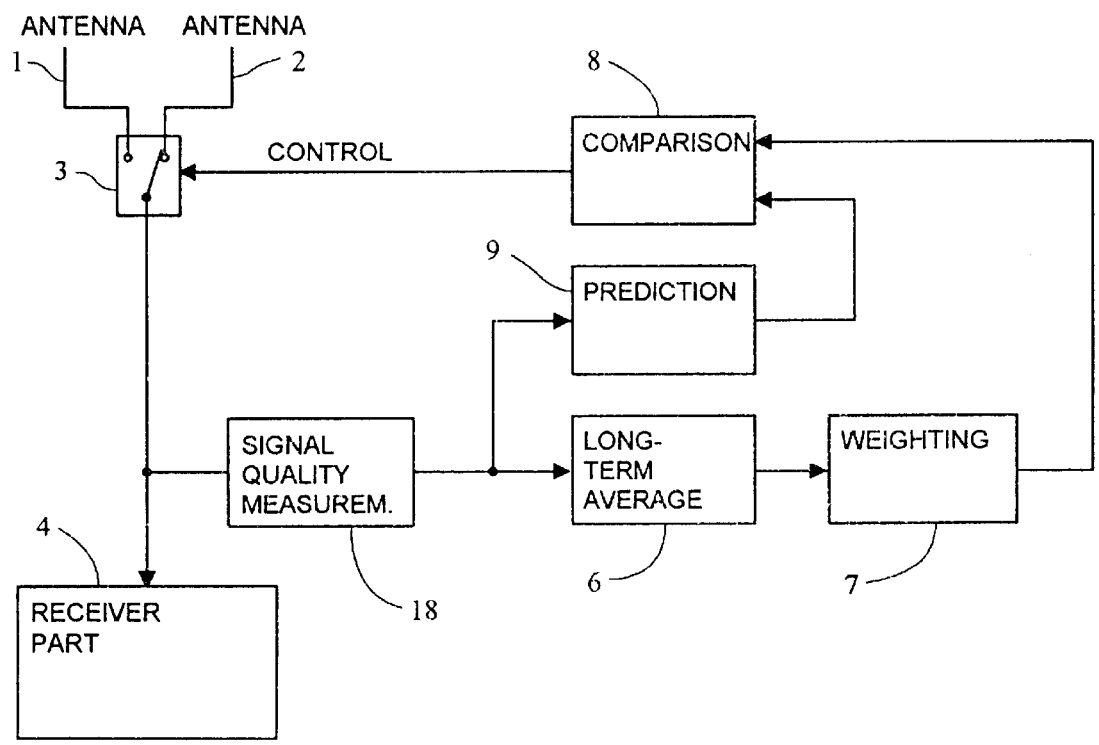
FIG. 2 is a block diagram that illustrates an embodiment of a diversity method according to the present invention.
Figure 3:
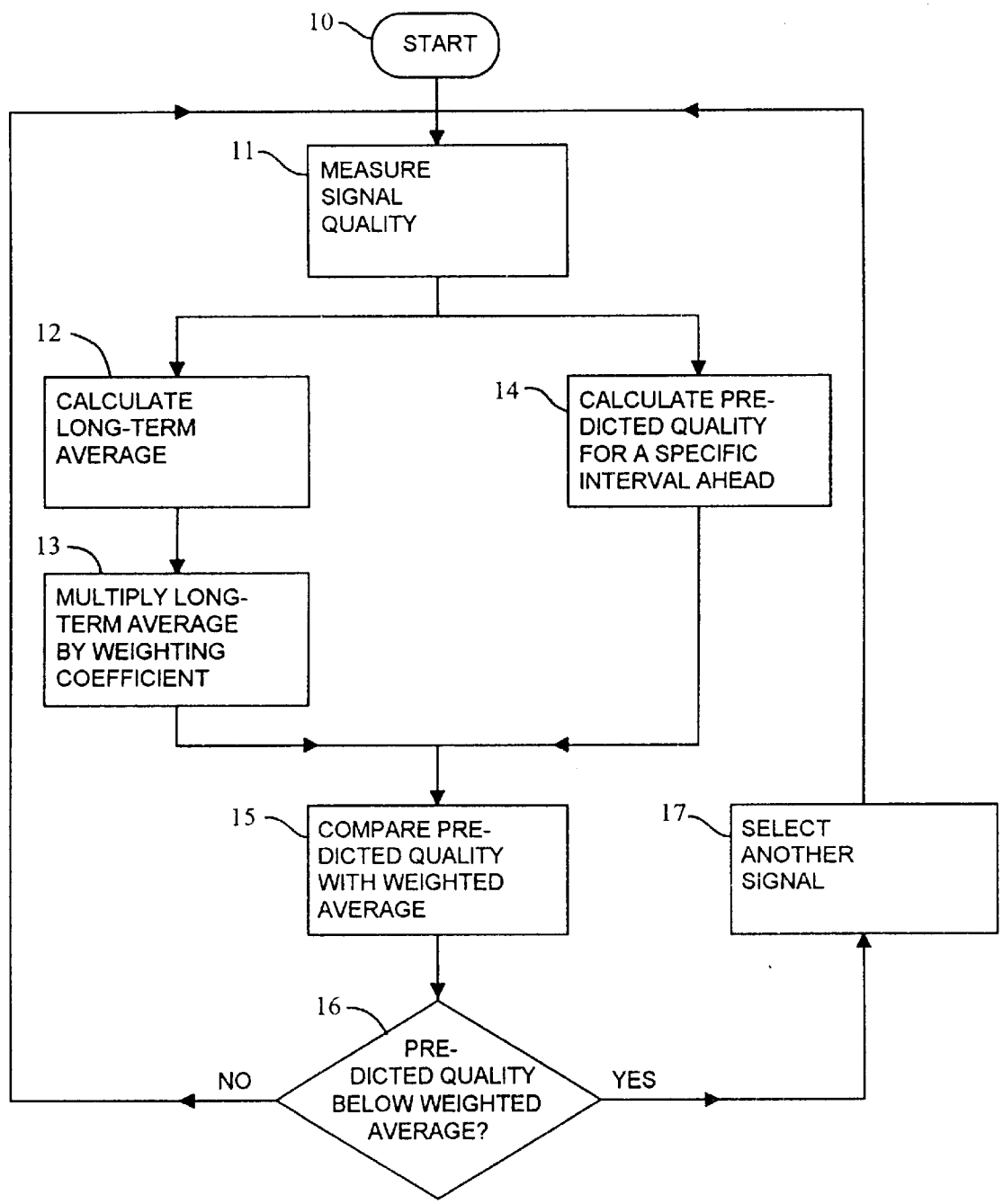
FIG. 3 presents as a flow chart the same embodiment of a method according to the present invention.

It is essential in a diversity method according to the present invention, an embodiment of which is illustrated in FIGS. 2 and 3, that the selection of a signal is based on its predicted quality and not on the present quality as in the method illustrated in FIG. 1. In the comparison block 8 of FIG. 2, which produces a control signal for an antenna selection switch 3, one of the objects of comparison is the weighted long-term average quality of the signal, as in the method of FIG. 1. The predicted quality obtained by calculation from the measured quality in block 9 is compared to said average quality. If the predicted quality of the signal for a certain coming interval is below a specific limit represented by the weighted long-term average, block 8 causes switch 3 to change antennas and thereby the received signal.

In the flow chart of the figure, the quality of the received signal is measured in phase 11 of the method. The measured or estimated parameter may be, for example, signal strength, signal-to-noise ratio, or bit error ratio. In a time-divided digital system, in which a signal is received as short bursts located in certain time intervals, the quality of the signal is advantageously measured from every burst. The long-term average is calculated from the values of the measured or estimated quality parameters over a period of time long enough to truly represent the average quality of the signal. The average is multiplied in phase 13 by a weighting coefficient used to optimize the functioning of the method in each application. In phase 14, a predicted value is calculated for a certain coming interval from the measured or estimated quality parameters. A suitable prediction interval naturally depends on, for example, how quickly fadeouts are expected to develop and how long they are expected to last. The predicted interval is selected to suit the application.

For example, in WLL radio channel measurements it has been determined that the typical duration of fadeouts is several seconds. In one simulation model consisting of a GSM data channel transmitter (9,6 kbit/sec), a WLL channel and a GSM receiver, a value for a signal-to-noise ratio estimation (SNR estimation) of a channel equalizer is calculated from the average of 50 bursts, in other words, from the time span of 50 frames, which in this case is 50×4,615 msec=230,75 msec. This long-term average is weighted with a coefficient of 1,2. The predicted value for 8 frames ahead, or 36,92 msec (8×4,615 msec), is calculated from the SNR estimations of the measured burst and the previous burst by linear extrapolation. In phase 15 of the method of FIG. 3, the predicted value is compared with the weighted average value. If the predicted value is above the weighted average value, the procedure returns to phase 11 to measure the quality of the signal. If, on the other hand, the predicted value is below the weighted average value, another signal is selected in phase 17, and then the procedure returns to phase 11 to measure the quality of the signal.

Figure 4:
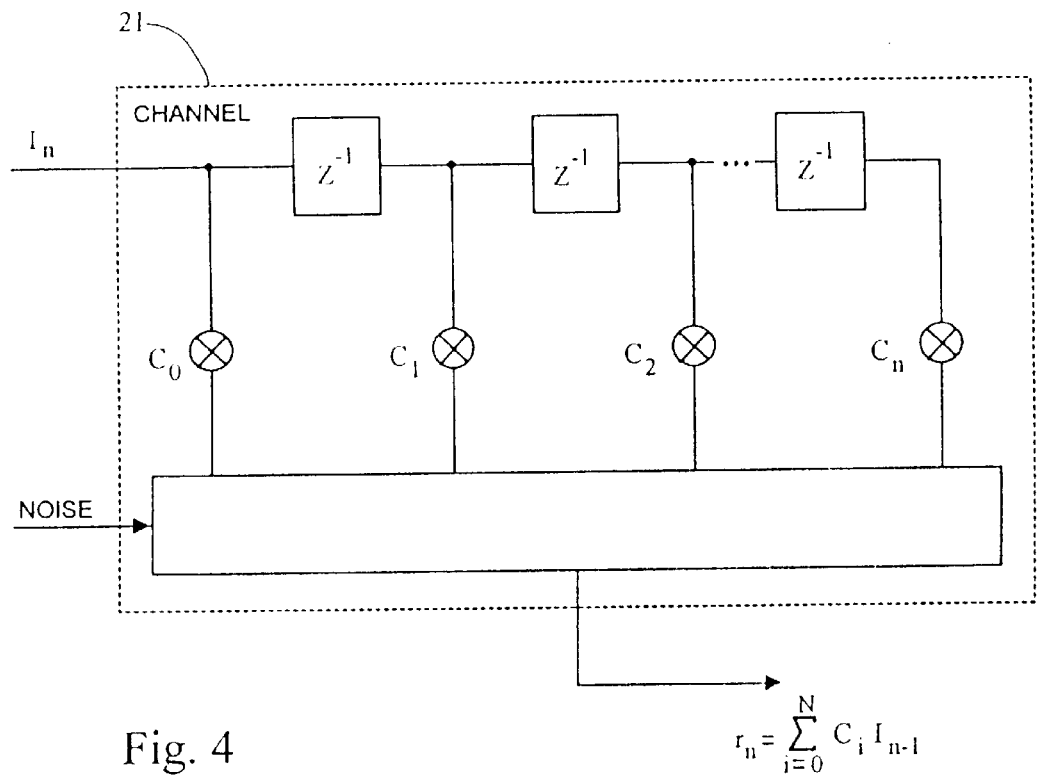
FIG. 4 is a diagram that illustrates a method for measuring the quality of a signal, which can be used in conjunction with a diversity method according to the present invention.

A quality measurement algorithm that is very suitable for a diversity method according to the present invention is presented below. A WLL system can be realized as a GSM or a DAMPS application, for example, and the following examination holds true for both realizations. In this case, a channel is examined as an FIR filter in the manner shown in FIG. 4. Symbols $I_n$ are complex numbers in a receiver. First, said symbols will be detected. Bits are obtained by examining the change in phase of consecutive symbols. and the purpose of the detector in reception is to determine without error which bits have been sent. A channel equalizer is a detector that is capable of doing this even though the symbols have overlapped in the channel. In order for the equalizer to do this, it must know the channel. For this reason, it estimates the channel and the channel coefficients $C_0, C_1, C_2, \ldots, C_n$ estimate how the channel spikes will show up in the receiver. A sample $r_n$ obtained from the received signal at moment n is equal to:

$$r_n = \sum_{i=0}^{N} C_i I_{n-1} \quad (1)$$

The quality matrix MSE can be calculated from the training sequences of the burst or from data. The estimation calculated from the training sequence is:

$$MSE = \frac{\sum_{i=0}^{N} |C_i|^2}{\sum_{n=1}^{M} \left| r_n - \sum_{i=0}^{N} C_i I_{n-1} \right|^2} \quad (2)$$

where:

N is the number of spikes minus one,

M is the number of learning symbols, $r_n$ is a sample of the received signal at moment n, $I_n$ is a symbol of the training sequence and $C_i$ is a channel coefficient with delay i, estimated from the same sequence.

If the quality is estimated from the training sequence, decision-making errors do not occur. If, however, the following equation (3) is used, then the divisor—if Viterb's algorithm is used—is the value of the cumulative matrix of the terminated sequence, and no other calculation is necessary.

The estimation calculated from data is:

$$MSE = \frac{\sum_{a=0}^{b}\sum_{i=0}^{N}|C_{ai}|^2}{\sum_{n=j}^{J+K-1}|r_n - \sum_{i=0}^{N}C_i I_{n-1}|^2} \quad (3)$$

where:
- $r_n$ is a sample of the received signal at moment n,
- $I_n$ is the symbol of the most probable data sequence,
- $C_{ai}$ is a channel coefficient with delay i, estimated from training sequence a,
- b is the number of training sequences used for detection minus 1 (GSM: b=0; DAMPS: b=1),
- j is the beginning of the data to be detected and
- K is the number of detected symbols.

Actually, the frame contains only one training sequence in both the GSM and DAMPS applications, but in the DAMPS application the training sequence is located at the beginning of the frame and in the GSM application it is located in the middle. Therefore, in the DAMPS application it is advantageous to "steal" the training sequence from the following frame and calculate the average of two training sequences.

The equalizer searches for the most probable symbol sequence. Viterb's algorithm is usually used for this task, and the result of the method is a sequence that gives a minimum value to the divisor of the equation (3).

Figure 5:
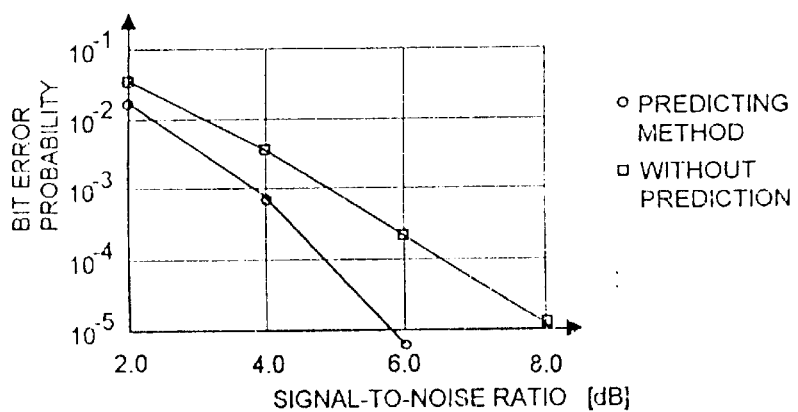
FIGS. 5 and 6 present results obtained in a simulation of a diversity method according to the present invention as compared with certain other diversity methods.
Figure 6:
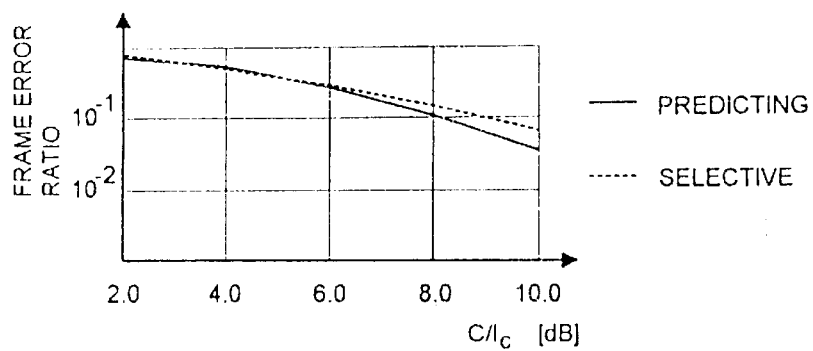

FIG. 5 presents the results of bit error ratio simulation for both the predicting method and the method of the prior art shown in FIG. 1 in an example case whose parameter values were examined above in conjunction with the explanation related to FIGS. 2 and 3. The results are from a data channel with a capacity of 9,6 kbit/sec on which channel 42 000 frames were transmitted. The result indicates that by using the predicting diversity method presented herein, performance is improved by about 2 dB at a bit error ratio of $10^{-5}$. It was also verified during simulation that the performance of a predicting diversity method according to the present invention is nearly as good as that of a selective diversity method in a noise-limited situation. In an interference-limited situation the performance of the method according to the present invention is even better than that of the method of the prior art. This is illustrated by FIG. 6, which presents the performance of the method in an interference-limited situation. The label $C/I_c$ in the figure refers to the ratio of the carrier to the interference (Carrier/Interference$_{co\text{-}channel}$). Here 42 000 frames have been sent on a voice channel. There is one interfering transmission, and it is in phase with the frame with regard to the effective signal. The reason why it is possible to reach performance that is better than that of the diversity method of the prior art is that the learning phases in the method of the prior art may overlap, at least in the GSM application, interfering with each other so strongly that they disturb channel estimation.

Certain embodiments of the present invention are described in detail above, but naturally the present invention is not limited to said embodiments. A switching diversity method in which a receiver is made to select a second of two antennas if the predicted quality of a signal received by a first antenna weakens below a weighted long-term average, is presented as an example. An expert in the field understands that a switching and searching method can be used just as well. If the predicted quality of the signal of all selectable antennas in a switching and searching method is below a defined limit, the procedure will wait for a signal with better quality, i.e., a signal whose predicted quality is better than that if the last measured signal. The quality of a signal can be measured by other means than those presented above. Furthermore, the method used in predicting may be different from the simple, easily utilized linear extrapolation described above. Extrapolation can be based on more than two measured values, and the method used may be the least squares method. An expert in the field also understands that the limit that the value of the signal is compared with may be defined in many other ways than the weighted long-term average. The time for which the average is calculated and the interval for which the predicted value is calculated may naturally vary considerably depending on the application.

The patent may vary within the limits of the enclosed claims.

We claim:

1. In a radio communications system, said system including multiple antennae for receiving signals and a control processor for identifying said antennae and processing said signals, and in which the typical duration of fadeouts in said system is in the magnitude of seconds, a method of assigning an antenna to receive a signal comprising the steps of:
   measuring a parameter of the signal representative of signal quality;
   storing a simulation model for said measured parameter in said control processor;
   predicting the value of said measured parameter for subsequent periods of operation from the measured parameter, based on said model;
   setting a value for said parameter at which antenna selection should be made;
   comparing the predicted value to the set value; and
   assigning said signal to an antenna based on the difference between said predicted value and said set value.

2. The diversity method according to claim 1, characterized in that the quality of the signal is predicted for a time span that is short compared to the typical duration of fadeouts.

3. The diversity method according to claim 1 in a radio system in which signals are digital time-divided signals made up of bursts in certain intervals of consecutive frames that are divided into intervals, characterized in that signal quality is measured from a burst, and the signal quality is predicted for several frames ahead based on the measured signal quality of said burst and one or more bursts prior to said burst.

4. The diversity method according to claim 1, characterized in that the quality of the signal is predicted from the measured results by means of extrapolation.

5. The diversity method according to claim 1, characterized in that the quality of the signal is measured by measuring or estimating one of the following: signal strength, bit error ratio, signal-to-noise ratio, mean square error.

6. The diversity method according to claim 1, characterized in that some other signal is selected if the predicted quality of the first signal goes below a limit specified for the signal quality.

7. The diversity method according to claim 1, characterized in that a limit is specified for the signal quality by calculating a weighted long-term average value.

8. The diversity method according to claim 1, characterized in that if the predicted quality of the measured signal goes below a specified limit, different antennas are connected and reception of the first signal whose predicted quality is above the specified limit is begun.

9. The diversity method according to claim 1, characterized in that if different antennas are connected and the predicted signal quality of all the antennas is below the specified limit, the signal is received whose predicted quality is higher than the last measured quality.

10. In a radio communication network having switching position diversity reception and in which the typical duration of fadeouts in said system is in the magnitude of seconds, a system for assigning a signal to an antenna comprising:

a receiver for acquiring signals and measuring a parameter of the signal representative of signal quality;

a processor containing modeling software constructed to predict a value of said measured parameter for subsequent periods of operation from the measured parameter;

a comparator connected to compare the predicted value from said processor with a set value of said parameter stored therein;

a switch for assigning a signal to an antenna in response to the difference between said predicted value and said set value.

\* \* \* \* \*